(12) United States Patent
Patel (10) Patent No.: US 12,230,010 B2
(45) Date of Patent: Feb. 18, 2025

(54) TRAINING OF CLASSIFIERS AND/OR REGRESSORS ON UNCERTAIN TRAINING DATA

(71) Applicant: Robert Bosch GmbH, Stuttgart (DE)

(72) Inventor: Kanil Patel, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 389 days.

(21) Appl. No.: 17/656,453

(22) Filed: Mar. 25, 2022

(65) Prior Publication Data

US 2022/0366672 A1   Nov. 17, 2022

(30) Foreign Application Priority Data

Apr. 30, 2021   (EP) ..................................... 21171428

(51) Int. Cl.
  *G06V 10/764* (2022.01)
  *G06N 20/00* (2019.01)

(52) U.S. Cl.
  CPC ........... *G06V 10/764* (2022.01); *G06N 20/00* (2019.01)

(58) Field of Classification Search
  CPC ........ G06V 10/764; G06N 20/00; G06N 3/08; G06F 18/214; G06F 18/24133; G06F 18/2431; G06F 17/18
  See application file for complete search history.

(56) References Cited

U.S. PATENT DOCUMENTS

| | | | |
|---|---|---|---|
| 2018/0268220 A1* | 9/2018 | Lee | G06V 10/82 |
| 2019/0147320 A1* | 5/2019 | Mattyus | G06V 20/182 |
| | | | 382/155 |
| 2019/0171871 A1* | 6/2019 | Zhang | G06V 40/103 |

(Continued)

FOREIGN PATENT DOCUMENTS

DE   102018222672 A1   6/2020

OTHER PUBLICATIONS

Shorten et al., "A Survey on Image Data Augmentation for Deep Learning," Journal of Big Data, 2019, pp. 1-48.

(Continued)

*Primary Examiner* — Chan S Park
*Assistant Examiner* — D J Dhooge
(74) *Attorney, Agent, or Firm* — NORTON ROSE FULBRIGHT US LLP; Gerard A. Messina (57) ABSTRACT

A method for training a classifier and/or regressor. The method includes: providing training samples labelled with ground truth classification and/or regression scores; and for each training sample from at least a subset of the training samples: determining a confidence score that quantifies an uncertainty of the training sample, and/or an ease or difficulty of classifying this sample, and reducing a largest ground truth classification and/or regression score with respect to one class and/or regression value by an amount that is dependent on the confidence score, and distributing the amount to ground truth classification and/or regression scores with respect to other classes and/or regression values; mapping the training samples to classification and/or regression scores; rating a deviation of the classification and/or regression scores from the updated ground truth classification and/or regression scores; and optimizing parameters that characterize the behavior of the classifier and/or regressor.

13 Claims, 4 Drawing Sheets

(56) References Cited

U.S. PATENT DOCUMENTS

2019/0370660 A1* 12/2019 Wong .................... G06N 3/084
2020/0225673 A1*  7/2020 Ebrahimi Afrouzi .... G06N 5/04
2020/0258215 A1*  8/2020 Kashyap ................ G06V 10/82

OTHER PUBLICATIONS

Zhong et al., "Random Erasing Data Augmentation," the Thirty-Fourth AAAI Conference on Artificial Intelligence (AAAI-20), 2020, pp. 13001-13008.

* cited by examiner

TRAINING OF CLASSIFIERS AND/OR REGRESSORS ON UNCERTAIN TRAINING DATA

CROSS REFERENCE

The present application claims the benefit under 35 U.S.C. 119 of EP Patent Application No. EP 21 17 1428.2 filed on Apr. 30, 2021, which is expressly incorporated herein by reference in its entirety.

FIELD

The present invention relates to the training of classifiers and/or regressors that are used to interpret samples of measurement data, such as images, spectra or point clouds, for automatically steering a vehicle through road traffic or other purposes.

BACKGROUND INFORMATION

Automatic steering of a vehicle through road traffic requires capturing the environment of the vehicle and taking action in case a collision with an object in the environment of the vehicle is imminent. Safe automated driving also requires obtaining a representation of the environment of the vehicle and localizing objects.

Capturing objects by means of radar is independent from the lighting conditions in the traffic scene. For example, even at night, objects may be detected at a large distance without blinding oncoming traffic with high-beam illumination. Also, radar measurements immediately yield the distance to an object and the speed of that object. This information is important for determining whether a collision with an object is possible. However, the radar data does not allow a direct determination of the type of an object.

German Patent Application No. DE 10 2018 222 672 A1 describes a method for determining the spatial orientation of an object based on a measurement signal that comprises the response of the object to electromagnetic interrogation radiation. In particular, this response may comprise a reflection of the interrogation radiation. A classifier, and/or a regressor, is used to determine the sought spatial orientation.

SUMMARY

The present invention provides a method for training a classifier and/or regressor. A classifier is configured to map an input sample of measurement data to a set of classification scores with respect to classes of a given classification. A regressor is configured to map such an input sample to regression scores with respect to regression values.

In accordance with an example embodiment of the present invention, the method starts with providing a set of training samples that are labelled with ground truth classification and/or regression scores. The most common form of ground truth classification scores is "one-hot" scores that assign exactly one class to the training sample with full confidence. In particular, where training samples are manually labelled by humans, this kind of label is the easiest to obtain with high throughput.

For each training sample from at least a subset of the training samples a confidence score E is obtained. This confidence score E quantifies an uncertainty of the training sample, and/or an ease or difficulty of classifying this particular sample. A largest ground truth classification and/or regression score with respect to one class and/or regression value by an amount that is dependent on the confidence score E, and this amount is distributed to ground truth classification and/or regression scores with respect to other classes and/or regression values. In this manner, updates ground truth classification and/or regression scores are obtained.

These updated ground truth classification and/or regression scores are then used to train the classifier and/or regressor. That is, the classifier and/or regressor maps the training samples to classification and/or regression scores. By means of a predetermined loss function, a deviation of the classification and/or regression scores from the updated ground truth classification and/or regression scores is rated. Parameters that characterize the behavior of the classifier and/or regressor are updated with the objective that, when further training samples are supplied to the classifier and/or regressor, the rating by the loss function is likely to improve.

For example, the classifier and/or regressor may comprise or be a neural network, and the parameters that characterize its behavior may comprise the weights of this network. By means of these weights, inputs to neurons or other processing units are summed into a weighted sum that is then used as an activation of this neuron or other processing unit. The final output of the neuron or processing unit is then determined by applying a nonlinear function to this activation.

By reducing a largest ground truth classification and/or regression score, the labelling is brought closer to the reality: Given a set of training samples comprising measurement data, the property that is denoted by the respective ground truth score will not be perfectly recognizable in every single training sample. For example, if the training samples comprise pictures and the ground truth classification scores denote objects that these images show, there will be pictures where the distinction between objects of different classes is clear-cut, but also other pictures that do not allow an easy distinction between classes. For example, a leopard may be easily distinguishable from a jaguar in daylight and at close range, but when viewed at a larger distance and/or in poor visibility conditions, the distinction is more difficult.

By taking the confidence score E into account and reducing the largest ground truth scores accordingly, the tendency of the training to encourage "over-confident" predictions is reduced. Moreover, if the quality of training samples varies across the set of training samples, the training effect from these training samples may be aggregated in a more meaningful manner. This is somewhat akin to the process by which the official values of physical constants are determined based on measurement results from multiple labs: Every involved lab has some "credibility factor", and the individual measurement results are weighted with the respective credibility factors.

A classifier and a regressor are not mutually exclusive. A single network architecture may well have a first output head that outputs a classification score and a second output head that outputs some regression value. In particular, it is possible to amalgamate a classifier and a regressor together so that they share some parts. The method of the present invention may be used in full on such an architecture. Architectures of this kind are conventional in the field of neural networks where it is a prominent desire to use the smallest possible architecture for the job at hand and reduce the number of parameters of the network.

There is no limitation as to which kind of confidence score is used. A confidence score may be supplied by any function that maps a training sample, and optionally additional context information about this training sample, to an ease or difficulty of classifying this particular sample. In a most basic example, the confidence of some quantity may be linked to the margin of error with which this quantity is given. This concept is conventional to every engineer or scientist working with measured quantities of some sort.

Also, when determining the amount of the reduction, any suitable functional dependency of the amount on the confidence score may be used.

On the other hand, the confidence score is no "one size fits all". The best way to determine the confidence score will depend on the concrete application at hand. Examples and embodiments described in the following provide guidance to the person skilled in the art as to how the determination of the confidence score may be adapted in order to tailor the behavior of the confidence score. I.e., the collection of options is to be regarded as a "toolbox" from which the person skilled in the art can pick individual elements, or combinations of elements, to fit a particular given application.

The wording "a largest" is simply to mean that the maximum value of the ground truth classification and/or regression score may be taken in two or more places. For example, a classification score vector may have two or more components for different classes with a same high score value.

The wording "with respect to" refers to the typical situation that, e.g., the classifier outputs a vector with a lot of classification scores, and each score belongs to one of the available classes. Thus, anybody skilled in the field of machine learning knows the meaning of "with respect to".

Classification scores are always available in a concrete application even if the ground truth consists in a class or a set of classes; this will translate to a vector of classification scores, e.g., a "one-hot" vector where one single component is 1 and all other components are 0.

The term "distributing" means that the deducted amount does not simply disappear, but is given to other ground truth classification/regression scores in the sense of an earth-moving problem where "votes" in favor of certain classes can only move between classes, but are neither created nor destroyed. This concept is conventional to any person skilled in the art of machine learning.

The phrase "is likely to improve" refers to the well-known fact that during an optimization process of the parameters, in each step of the optimization, the updated parameter values are chosen in the hope that the value of the loss function is improved, but there will never be an improvement for each and every update step. Rather, in every optimization, situations will arise where the value of the loss function becomes worse, and this is used as a feedback to choose new updated parameter values.

Therefore, in one advantageous embodiment of the present invention, the confidence score E is a measure of the quality of the training sample, and/or of the amount of class-specific information contained in the training sample.

For example, the training samples may comprise images, and the confidence score E may be determined with a predetermined function that characterizes the quality with which the image was acquired. This predetermined function may, for example, be chosen to characterize properties that are most likely to influence how well class-specific information may be recognized from the sample. For example, the predetermined function may characterize one or more of:
  a presence of noise or other disturbances in the images;
  overexposure or underexposure of images or parts thereof;
  a saturation of pixel intensities at an upper or lower end of a permitted range in the images or parts thereof;
  a presence of blur in the images due to motion and/or defocus; and/or
  lighting and/or weather conditions at the time at which the image was acquired.

Another important data type that may be used as training samples is spectra and/or point clouds obtained by sending out radar, lidar and/or ultrasound radiation. When these measurement modalities are used, the data quality and the ease or difficulty with which class-relevant information may be discerned depend on many factors.

In particular, the confidence score E may be determined based on a measure for one or more of:
  the signal-to-noise ratio of the radar, lidar and/or ultrasound measurement with which the training sample was acquired;
  interference and/or environmental effects during the radar, lidar and/or ultrasound measurement with which the training sample was acquired;
  ambiguities between different objects when viewed from different angles and distances;
  occlusion of objects by other objects; and
  a variability within different instances of one and the same object class.

Interference may, for example, be caused by multiple reflections of the radar, lidar and/or ultrasound radiation. For example, in a narrow road that is bounded by rigid walls or buildings, radar radiation may be reflected multiple times and cause "ghost" copies of objects to appear in the measurement data.

The root cause for ambiguities is that the radar, lidar or ultrasound radiation is reflected back to the respective sensor only from a relatively small number of locations on an object. Therefore, multiple distinct objects may give rise to reflected radiation being received from roughly the same locations. The smaller the number of locations, the higher the potential for ambiguities.

Occlusion of objects by other objects is a particularly frequent occurrence in measurement data that represent traffic situations. For example, accidents frequently occur when a pedestrian steps onto a road through a gap between parked cars, so that the pedestrian is at least partially occluded for most of the time. At the time the pedestrian becomes fully visible, a car driving along the road has only very little time left to brake or steer around the pedestrian.

These examples are dependent on concrete properties of images, respectively of radar, lidar or ultrasound measurements, that every person skilled in the art of performing the respective measurements knows to determine. For example, one way to determine a saturation of pixel intensities is to count the number of pixels whose intensity values are at the upper or lower end of the permitted range. A signal-to-noise ratio is a very basic quantity of a radar, lidar or ultrasound measurement.

In a particularly advantageous embodiment of the present invention, the confidence score E comprises a contribution $\epsilon_R$ that is dependent on a range R between a sensor with which the training sample was acquired and at least one object that has reflected radar, lidar and/or ultrasound radiation. For example, this contribution may be calculated according to the formula $$\epsilon_R = 1 - \exp\left(-\alpha \frac{R - r_{min}}{r_{max} - r_{min}}\right),$$

wherein $r_{min}$ and $r_{max}$ are the minimum and maximum range values in the set of training samples. α is a hyperparameter that determines the strength of the dependence of $\epsilon_R$ on R. The farther away an object is, the smaller the solid angle that this object covers is. Therefore, locations on the object from which reflected radiation is received are very close together and have a larger margin of error. The contribution $\epsilon_R$ does not depend on classes of objects.

In a further particularly advantageous embodiment of the present invention, the confidence score E comprises a contribution $\epsilon_\pi$ that is dependent on a power π of reflected radar, lidar and/or ultrasound radiation received from at least one object. For example, this contribution may be calculated according to the formula $$\epsilon_\pi = 1 - \exp\left(-\alpha\left(1 - \frac{\pi(x) - \pi_{min}}{\pi_{max} - \pi_{min}}\right)\right).$$

Herein, π(x) is the average received power per pixel of the input sample. For a sample with P pixels that each get received powers $x_p$, the average received power π(x) is $$\pi(x) = \frac{1}{P}\sum_{p=1}^{P} x_p.$$

$\pi_{min}$ and $\pi_{max}$ are the minimum and maximum average received powers in the set of training samples. Highly reflective larger objects will produce higher received powers, whereas smaller or less reflective objects will produce weaker received powers, which will in turn cause $\epsilon_P$ to increase. The contribution ∈ P preserves differences between classes because it preserves the information that smaller objects reflect less.

It is clear to the person skilled in the art that each of the provided contribution $\epsilon_R$ that is dependent on a range R on the one hand, and a contribution $\epsilon_\pi$ that depends on a received power π on the other hand, may also be used on their own to determine the confidence score because $\epsilon_R$ and $\epsilon_\pi$ are not mutually dependent.

The contributions $\epsilon_R$ and $\epsilon_P$ may be better understood with the analogy of flying a drone and keeping track of its position and orientation. The smaller the drone is and the farther it is away, the harder it is to discern the position and orientation with the naked eye.

Preferably, the amount by which a largest ground truth classification and/or regression score has been reduced is distributed to ground truth classification and/or regression scores with respect to other classes and/or regression values according to a given prior distribution over the classes, and/or over regression values. For example, if this prior distribution is v, a one-hot score y may be modified to $$\tilde{y}=(1-\epsilon)y+\epsilon v.$$

For example, if there are n different classes, v=1/n may be used as a prior distribution.

As discussed in the examples of ∈ P and ∈ R above, the confidence score ∈ may be determined using a function whose behavior is characterized by at least one hyperparameter α. This hyperparameter α may also be optimized with the objective that, when further training samples are supplied to the classifier and/or regressor, the rating by the loss function is likely to improve. This optimization may be performed hand in hand with the optimization of the parameters of the classifier and/or regressor. But alternatively, for example, the optimization of the parameters of the classifier and/or regressor may also be performed multiple times for different values of α. The value of α for which the training results in the best accuracy as measured on test or validation data may then be chosen as the optimum of α.

The ultimate purpose of the improved training is to produce a classifier and/or regressor that produces more accurate classification and/or regression results from real measurement data.

Therefore, the present invention also provides another method that exploits these benefits of the trained classifier and/or regressor.

This method starts from a to-be-trained or pre-trained classifier and/or regressor that is configured to map an input sample of measurement data to a set of classification and/or regression scores with respect to classes of a given classification and/or regression values. This classifier and/or regressor is trained with the method described above.

At least one sample of measurement data is acquired using at least one sensor carried by a vehicle. Using the trained classifier and/or regressor, the sample of measurement data is mapped to classification and/or regression scores.

Based at least in part on the classification and/or regression scores, an actuation signal is determined. The vehicle is actuated with this actuation signal.

In this context, the end result of the training is that in the traffic situation captured by the at least one sensor, the probability that the action taken by the vehicle as a result of actuation with the actuation signal is appropriate is increased.

The methods described above may be wholly or partially computer-implemented, and thus embodied in software. The present invention therefore also relates to a computer program, comprising machine-readable instructions that, when executed by one or more computers, cause the one or more computers to perform a method described above. In this respect, control units for vehicles and other embedded systems that may run executable program code are to be understood to be computers as well. A non-transitory storage medium, and/or a download product, may comprise the computer program. A download product is an electronic product that may be sold online and transferred over a network for immediate fulfilment. One or more computers may be equipped with said computer program, and/or with said non-transitory storage medium and/or download product.

In the following, the present invention and its preferred embodiments are illustrated using Figures without any intention to limit the scope of the present invention.

DETAILED DESCRIPTION OF EXAMPLE EMBODIMENTS

Figure 1:
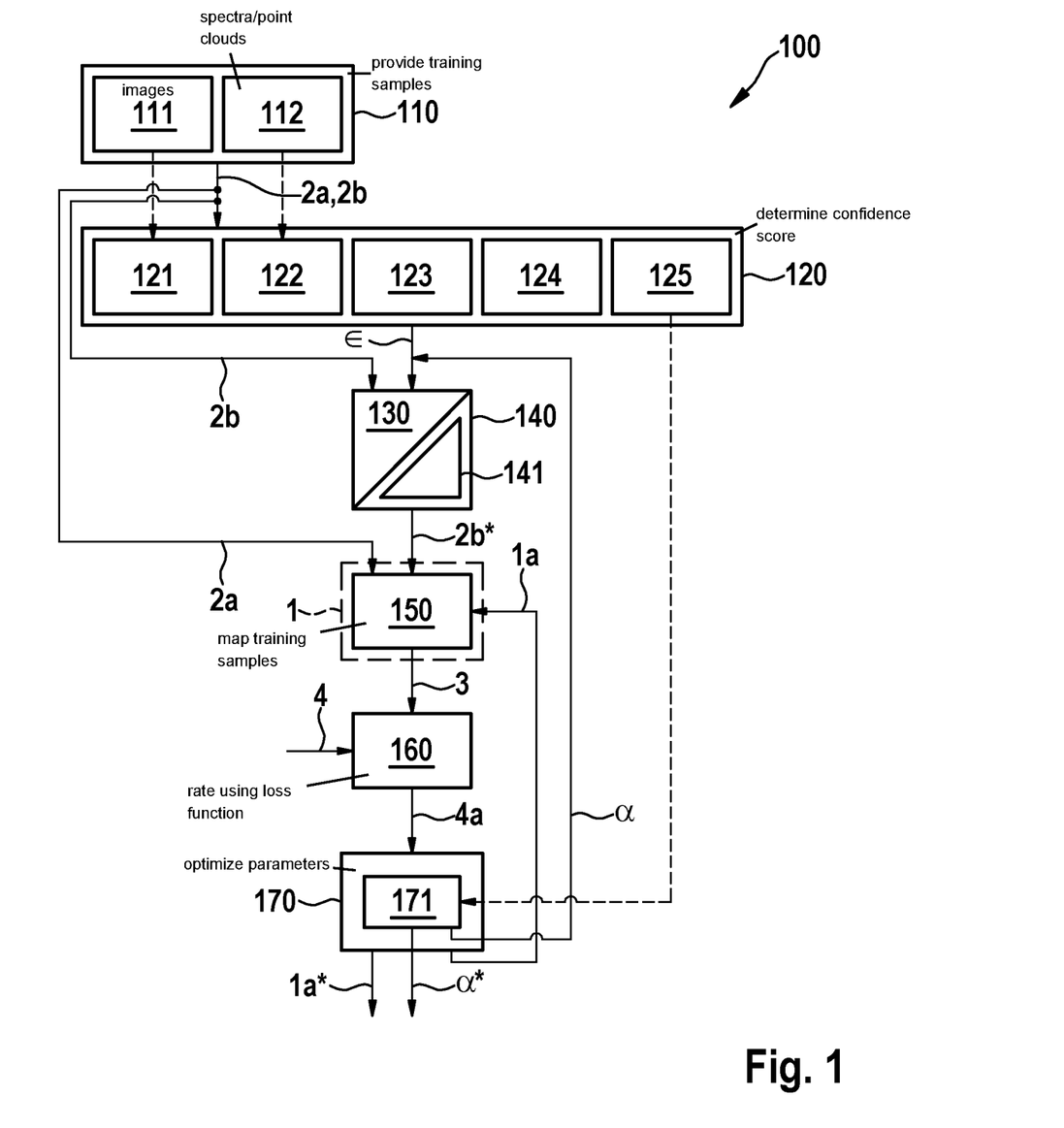
FIG. 1 shows an exemplary embodiment of the method 100 for training a classifier and/or regressor, in accordance with the present invention.

FIG. 1 is a schematic flow chart of an exemplary embodiment of the method 100 for training a classifier and/or regressor 1.

In step 110, a set of training samples 2a is provided. The training samples 2a are labelled with ground truth classification and/or regression scores 2b.

In step 120, for each training sample 2a from at least a subset of the training samples, a confidence score $\in_m$ is determined. This confidence score $\in$ quantifies an uncertainty of the training sample 2a, and/or an ease or difficulty of classifying this particular sample 2a.

According to block 111, the training samples 2a may comprise images. According to block 121, the confidence score $\in$ may then be determined with a predetermined function that characterizes the quality with which the image was acquired.

According to block 112, the training samples 2a may comprise spectra and/or point clouds obtained by sending out radar, lidar and/or ultrasound radiation and measuring an intensity of the reflected radiation. According to block 122, the confidence score $\in$ may then be determined based on a measure for one or more of:
- the signal-to-noise ratio of the radar, lidar and/or ultrasound measurement with which the training sample 2a was acquired;
- interference and/or environmental effects during the radar, lidar and/or ultrasound measurement with which the training sample 2a was acquired;
- ambiguities between different objects when viewed from different angles and distances;
- occlusion of objects by other objects; and
- a variability within different instances of one and the same object class.

According to block 123, the confidence score $\in$ may comprise a contribution $\in_R$ that is dependent on a range R between a sensor with which the training sample 2a was acquired and at least one object that has reflected radar, lidar and/or ultrasound radiation.

According to block 124, the confidence score $\in$ may comprise a contribution $\in_P$ that is dependent on a power $\pi$ of reflected radar, lidar and/or ultrasound radiation received from at least one object.

In step 130, a largest ground truth classification and/or regression score 2b with respect to one class and/or regression value is reduced by an amount that is dependent on the confidence score E. In step 140, this amount is distributed to ground truth classification and/or regression scores 2b with respect to other classes and/or regression values. In this manner, updated ground truth classification and/or regression scores 2b* are obtained.

According to block 141, the amount by which a largest ground truth classification and/or regression score has been reduced may be distributed to ground truth classification and/or regression scores with respect to other classes and/or regression values according to a given prior distribution over the classes, and/or over regression values.

In step 150, the training samples 2a are mapped to classification and/or regression scores 3 by the classifier and/or regressor 1.

In step 160, a deviation of the classification and/or regression scores (3) from the updated ground truth classification and/or regression scores 2b* is rated by means of a predetermined loss function 4.

In step 170, parameters 1a that characterize the behavior of the classifier and/or regressor 1 are optimized with the objective that, when further training samples 2a are supplied to the classifier and/or regressor 1, the rating 4a by the loss function 4 is likely to improve. The finally optimized state of the parameters 1a is labelled with the reference sign 1a*.

According to block 125, the confidence score $\in$ may be determined (125) using a function whose behavior is characterized by at least one hyperparameter $\alpha$. According to block 171, this hyperparameter $\alpha$ may then be optimized with the objective that, when further training samples 2a are supplied to the classifier and/or regressor 1, the rating 4a by the loss function 4 is likely to improve. The finally optimizes state of the hyperparameter $\alpha$ is labelled with the reference sign $\alpha^*$.

Figure 2:
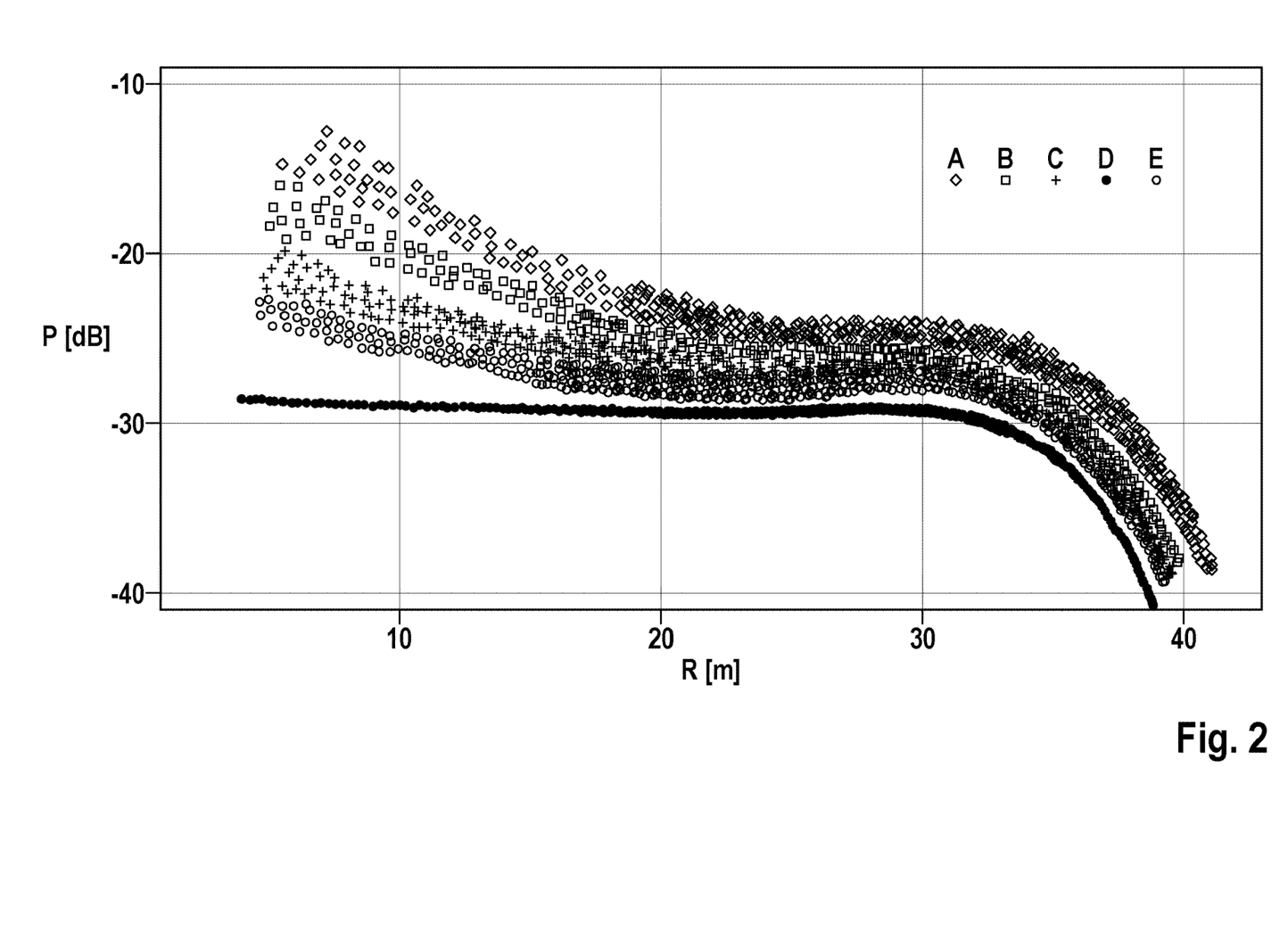
FIG. 2 shows exemplary dependencies of average reflected power P on range R for different objects.

FIG. 2 shows exemplary dependencies of average reflected radar power P on range R to an object for different kinds of objects. Data points A relate to a car as the object. Data points B relate to a motorbike as the object. Data points C relate to a bicycle as the object. Data points D relate to a pedestrian as the object. Data points E relate to noise that is measured when no object is present and no power is reflected.

Figure 3:
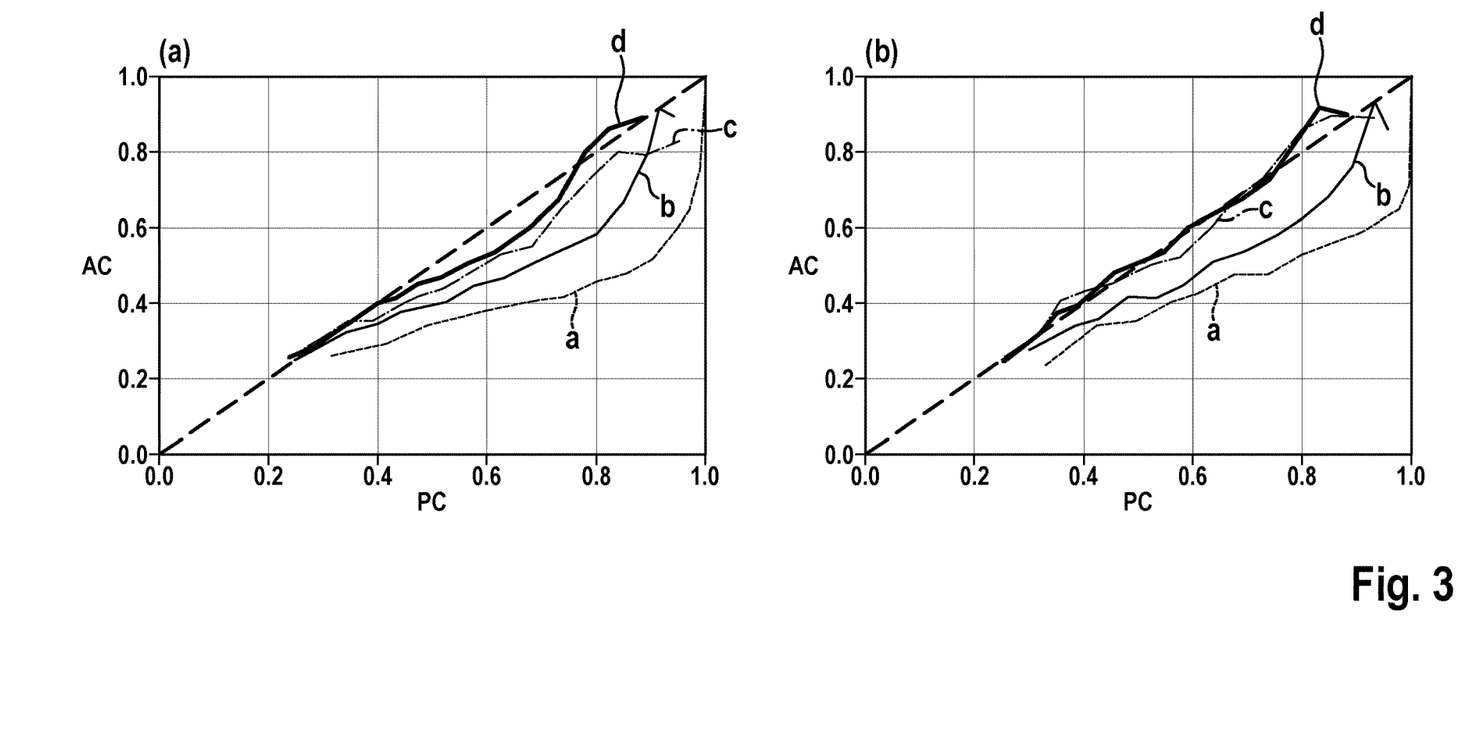
FIG. 3 shows reliability diagrams showing the performance of the method 100, in accordance with an example embodiment of the present invention.

FIG. 3 shows two reliability diagrams (a) and (b) for different tests of an exemplary classifier 1 that has been trained according to different strategies. The classification accuracy AC is plotted over the predicted confidence PC of the classification. The dashed line shows the ideal state, namely that the classification is predicted with a confidence score that corresponds exactly to the actual accuracy.

Curve a relates to a training with "one-hot" ground truth classification scores. Curve b relates to a training with updated ground truth classification scores 2b* obtained with a sample-dependent confidence score $\in$. Curve c relates to a training where the sample-dependent confidence score $\in$ comprises a range-dependent contribution $\in_R$. Curve d relates to a training where the sample-dependent confidence score $\in$ comprises a power-dependent contribution $\in_P$.

Figure 4:
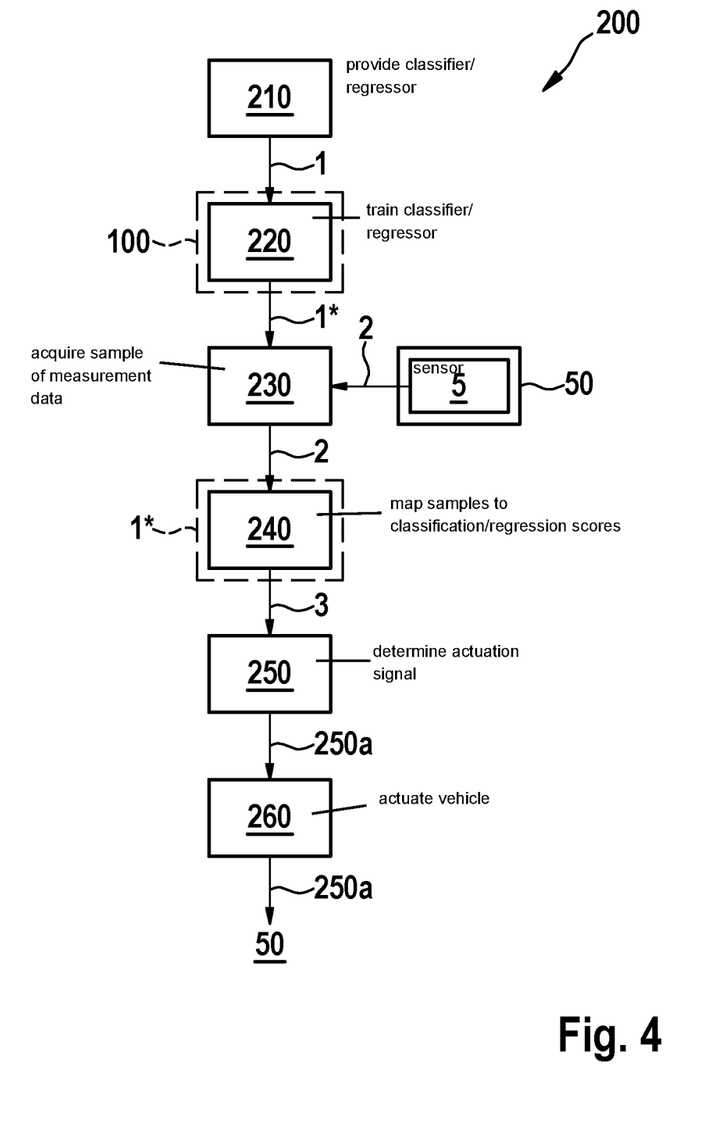
FIG. 4 shows an exemplary embodiment of the method 200, in accordance with the present invention.

FIG. 4 is a schematic flow chart of an exemplary embodiment of the method 200.

In step 210, a classifier and/or regressor 1 is provided. This classifier and/or regressor 1 is configured to map an input sample 2 of measurement data to a set of classification and/or regression scores 3 with respect to classes of a given classification and/or regression values.

In step 220, the classifier and/or regressor is trained with the method 100 described above.

In step 230, at least one sample 2 of measurement data is acquired using at least one sensor 5 carried by a vehicle 50.

In step 240, using the trained classifier and/or regressor 1*, the at least one sample 2 of measurement data is mapped to classification and/or regression scores 3.

In step 250, an actuation signal 250a is determined based at least in part on the classification and/or regression scores 3.

In step 260, the vehicle is actuated with the actuation signal 250a.

What is claimed is:

1. A method for training a classifier or a regressor that is configured to map an input sample of measurement data to: (i) a set of classification scores which are each a score with respect to a different respective class of available classes, or (ii) a set of regression scores which are each a score with respect to a different regression value of available regression values, the method comprising the following steps:
    providing a set of training samples, each of the training samples being labelled with: (i) ground truth classification scores which are each a score with respect to a different respective class of the available classes, or (ii) ground truth regression scores which are each a score with respect to a different regression value of the available regression values;

for each training sample from at least a subset of the training samples:
  determining a confidence score that quantifies: (i) an uncertainty of the training sample, or (ii) an ease or difficulty of classifying the training sample,
  reducing, by an amount that is dependent on the confidence score: (i) a largest ground truth classification score of the ground truth classification scores with which the training sample is labeled, or (ii) a largest ground truth regression score of the ground truth regression scores with which the training sample is labeled, and
  distributing the amount to: (i) others of the ground truth classification scores of the ground truth classification scores with which the training sample is labeled, or (ii) others of the regression scores with which the training sample is labeled,
so as to obtain updated ground truth classification scores for the training sample, or updated ground truth regression scores for the training sample;
mapping, by the classifier or the regressor, each of the training samples to classification scores or regression scores;
rating, using a predetermined loss function, a deviation of the classification scores to which each training sample is mapped or the regression scores to which each training same is mapped, from the updated ground truth classification scores of the training sample or the updated ground truth regression scores of the training sample; and
optimizing parameters that characterize a behavior of the classifier of the regressor with an objective that, when further training samples are supplied to the classifier or the regressor, the rating by the loss function is likely to improve.

2. The method of claim 1, wherein the confidence score is a measure of a quality of the training sample, or of an amount of class-specific information contained in the training sample.

3. The method of claim 2, wherein the training samples include images and each confidence score is determined with a predetermined function that characterizes a quality with which the image was acquired.

4. The method of claim 3, wherein the predetermined function characterizes one or more of:
  a presence of noise or other disturbances in the image;
  overexposure or underexposure of the image or parts of the image;
  a saturation of pixel intensities at an upper or lower end of a permitted range in the image or parts of the image;
  a presence of blur in the image due to: motion or defocus;
  lighting and/or weather conditions at the time at which the image was acquired.

5. The method of claim 1, wherein the training samples include spectra or point clouds obtained by sending out: radar or lidar or ultrasound radiation, and measuring an intensity of reflected radiation.

6. The method of claim 5, wherein the confidence score is determined based on a measure for one or more of:
  the signal-to-noise ratio of the radar measurement with which the training sample was acquired or lidar measurement with which the training sample was acquired or ultrasound measurement with which the training sample was acquired;
  interference effects or environmental effects during the radar measuremet with which the training sample was acquired or lidar measurement with which the training sample was acquired or ultrasound measurement with which the training sample was acquired;
  ambiguities between different objects when viewed from different angles and distances;
  occlusion of objects by other objects;
  a variability within different instances of one and the same object class.

7. The method of claim 5, wherein the confidence score includes a contribution that is dependent on a range between a sensor with which the training sample was acquired and at least one object that has reflected radar or lidar or ultrasound radiation.

8. The method of claim 5, wherein the confidence score includes a contribution that is dependent on a power of reflected radar radiation received from at least one object or lidar received from the at least one object or ultrasound radiation received from the at least one object.

9. The method of claim 1, wherein the amount by which the largest ground truth classification score or the largest ground truth regression score has been reduced is distributed to (i) the others of the ground the truth classification scores of the ground truth classification scores with which the training sample is labeled, or (ii) the others of the regression scores with which the training sample is labeled, according to a given prior distribution over the ground truth classification scores or the ground truth regression scores.

10. The method of claim 1, wherein the confidence score is determined using a function whose behavior is characterized by at least one hyperparameter, and the hyperparameter is also optimized with an objective that, when further training samples are supplied to the classifier or the regressor, the rating by the loss function is likely to improve.

11. A method, comprising the following steps:
providing a classifier or a regressor that is configured to map an input sample of measurement data to: (i) a set of classification scores which are each a score with respect to a different respective class of available classes, or (ii) a set of regression scores which are each a score with respect to a different regressive value of available regression values;
training the classifier the regressor by:
  providing a set of training samples, each of the training samples being labelled with: (i) ground truth classification scores which are each a score with respect to a different respective class of the available classes, or (ii) ground truth regression scores which are each a score with respect to a different regression value of the available regression values;
  for each training sample from at least a subset of the training samples:
    determining a confidence score that quantifies: (i) an uncertainty of the training sample, of (ii) an ease or difficulty of classifying the training sample,
    reducing, by an amount that is dependent on the confidence score: (i) a largest ground truth classification score of the ground truth classification scores with which the training sample is labeled, a largest ground truth regression score of the ground truth regression scores with which the training sample is labeled, and
    distributing the amount to: (i) others of the ground the truth classification scores of the ground truth classification scores with which the training sample is labeled, others of the regression scores with which the training sample is, so as to obtain updated ground truth classification scores for the training sample, or updated ground truth regression scores for the training sample;

mapping, by the classifier or the regressor, each of the training samples to classification scores or regression scores;

rating, using a predetermined loss function, a deviation of the classification scores to which each training sample is mapped or the regression scores to which each training sample is from the updated ground truth classification scores of the training sample or the updated ground truth regression scores of the training sample; and optimizing parameters that characterize a behavior of the classifier or the regressor with an objective that, when further training samples are supplied to the classifier or the regressor, the rating by the loss function is likely to improve;

acquiring, using at least one sensor carried by a vehicle, at least one sample of measurement data;

mapping using the trained classifier the trained regressor, the at least one sample of measurement data to classification and/or regression scores;

determining an actuation signal based at least in part on the classification the regression scores; and actuating the vehicle with the actuation signal.

12. A non-transitory machine-readable storage medium on which is stored a computer program for training a classifier or a regressor that is configured to map an input sample of measurement data to: (i) a set of classification scores which are each a score with respect to a different respective class of available classes, or (ii) a set of regression scores which are each a score with respect to a different regression value of available regression values, the computer program, when executed by one or more computers, causing the one or more computers to perform the following steps:

providing a set of training samples, each of the training samples being labelled with: (i) ground truth classification scores which are each a score with respect to a different respective class of the available classes, or (ii) ground truth regression scores which are each a score with respect to a different regression value of the available regression values;

for each training sample from at least a subset of the training samples:

determining a confidence score that quantifies: (i) an uncertainty of the training sample, or (ii) an ease or difficulty of classifying the training sample, and reducing, by an amount that is dependent on the confidence score: (i) a largest ground truth classification score of the grout truth classification cores with which the training sample is labeled, or (ii) a largest ground truth regression score value of the grout truth regression scores with which the training sample is labeled, and distributing the amount to: (i) others of the ground the truth classification scores of the ground truth classification with which the training sample is labeled, or (ii) others of the ground truth regression scores with which the training sample is labeled, so as to obtain updated ground truth classification scores for the training sample, or updated ground truth regression scores for the training sample;

mapping, by the classifier or the regressor, each of the training samples to classification scores or regression scores;

rating, using a predetermined loss function, a deviation of the classification scores to which each training sample is mapped or the regression scores to which each training sample is mapped, from the updated ground truth classification scores of the training sample or the updated ground truth regression scores of the training sample; and optimizing parameters that characterize a behavior of the classifier or the regressor with an objective that, when further training samples are supplied to the classifier the regressor, the rating by the loss function is likely to improve.

13. One or more computers configured to train a classifier or a regressor that is configured to map an input sample of measurement data to: (i) a set of classification scores which are each a score with respect to a different respective class of available classes, or (ii) a set of regression scores which are each a score with respect to a different regression value of available regression values, the one or more computers configured to:

provide a set of training samples, each of the training samples being that are labelled with: (i) ground truth classification scores which are each a score with respect to a different respect class of the available classes, or (ii) ground truth regression scores which are each a score with respect to a different gression value of the available regression values;

for each training sample from at least a subset of the training samples:

determine a confidence score that quantifies: (i) an uncertainty of the training sample, (ii) an ease or difficulty of classifying the training sample, reduce, by an amount that is dependent on the confidence score: (i) a largest ground truth classification score of the ground truth classification scores with which the training sample is labeled, or (ii) a largest ground truth regression score of the ground truth regression scores with which the training sample is labeled, and distribute the amount to: (i) others of the ground the truth classification scores of the ground truth classification scores with which the training sample is labeled, (ii) others of the regression scores with which the training sample is labeled, so as to obtain updated ground truth classification scores for the training sample, or updated ground truth regression scores for the training sample;

map, by the classifier or the regressor, each of the training samples to classification scores or regression scores;

rate, using a predetermined loss function, a deviation of the classification score to which each training sample is mapped or the regression scores to which each training sample is mapped, from the updated ground truth classification scores of the training sample or the updated grount truth regression scores of the training sample; and optimize parameters that characterize a behavior of the classifier or the regressor with an objective that, when further training samples are supplied to the classifier or the regressor, the rating by the loss function is likely to improve.

* * * * *